(12) United States Patent
Guo et al.

(10) Patent No.: US 10,819,570 B2
(45) Date of Patent: Oct. 27, 2020

(54) PRIORITY BASED RECONFIGURATION SCHEME FOR REMOTE UNITS

(71) Applicant: CommScope Technologies LLC, Hickory, NC (US)

(72) Inventors: Zhen Guo, Forest, VA (US); Fred William Phillips, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/511,933

(22) Filed: Jul. 15, 2019

(65) Prior Publication Data

US 2019/0342155 A1 Nov. 7, 2019

Related U.S. Application Data

(63) Continuation of application No. 15/423,859, filed on Feb. 3, 2017, now Pat. No. 10,355,928.

(60) Provisional application No. 62/290,715, filed on Feb. 3, 2016.

(51) Int. Cl.
| | |
|---|---|
| *H04L 12/24* | (2006.01) |
| *H04W 24/04* | (2009.01) |
| *H04W 24/02* | (2009.01) |
| *H04W 88/08* | (2009.01) |

(52) U.S. Cl.
CPC ............ *H04L 41/082* (2013.01); *H04W 24/02* (2013.01); *H04W 24/04* (2013.01); *H04W 88/085* (2013.01)

(58) Field of Classification Search
CPC ...... H04L 41/082; H04W 8/30; H04W 24/04; H04W 88/085

USPC .................................. 455/418–420, 424–425
See application file for complete search history.

(56) References Cited

U.S. PATENT DOCUMENTS

| | | | |
|---|---|---|---|
| 6,326,806 | B1 | 12/2001 | Fallside et al. |
| 7,493,141 | B2* | 2/2009 | Brobston ............... H04B 1/006 455/285 |
| 9,088,386 | B2* | 7/2015 | Brisebois ................. H04K 3/42 |
| 2002/0128043 | A1 | 9/2002 | Chandler |
| 2007/0115950 | A1 | 5/2007 | Karaoguz et al. |

(Continued)

FOREIGN PATENT DOCUMENTS

WO      2015126730 A1      8/2015

OTHER PUBLICATIONS

International Searching Authority, "International Search Report and Written Opinion from PCT Application No. PCT/US2017/016388 dated May 23, 2017", from Foreign Counterpart to U.S. Appl. No. 15/423,859, pp. 1-13, Published: WO.

(Continued)

*Primary Examiner* — Congvan Tran
(74) *Attorney, Agent, or Firm* — Fogg & Powers LLC

(57) ABSTRACT

One embodiment is directed to a system comprising a first unit communicatively coupled to a second unit via a communication link. The second unit comprises a reconfigurable circuit, the reconfigurable circuit configured with the first or second circuit configuration image. The second unit further comprises an interface device configured to communicatively couple the second unit to the communication link, the second unit configured so that the interface device is configured with the first or second interface configuration image based on the configuration of the reconfigurable circuit configuration.

20 Claims, 4 Drawing Sheets

(56) References Cited

U.S. PATENT DOCUMENTS

| | | | |
|---|---|---|---|
| 2008/0270332 A1* | 10/2008 | Rudolf | G06N 3/063 706/14 |
| 2009/0286484 A1 | 11/2009 | Phung et al. | |
| 2012/0110150 A1 | 5/2012 | Kosuru et al. | |
| 2014/0137096 A1 | 5/2014 | Ueda et al. | |
| 2014/0160160 A1* | 6/2014 | Jung | G01C 21/20 345/633 |
| 2014/0243000 A1 | 8/2014 | Keevill et al. | |
| 2014/0293886 A1* | 10/2014 | Thakkar | H04W 8/183 370/329 |
| 2014/0297196 A1* | 10/2014 | Olson | C12Q 1/6869 702/19 |
| 2015/0012570 A1 | 1/2015 | Le et al. | |
| 2015/0143003 A1* | 5/2015 | Trout | G06F 16/90344 710/104 |
| 2015/0189509 A1 | 7/2015 | Sheikh et al. | |
| 2015/0326270 A1 | 11/2015 | Hanson et al. | |
| 2015/0331688 A1 | 11/2015 | Shimizu | |
| 2017/0164817 A1* | 6/2017 | Shiraishi | A61B 1/04 |
| 2017/0222869 A1 | 8/2017 | Guo et al. | |

OTHER PUBLICATIONS

U.S. Patent and Trademark Office, "Office Action", U.S. Appl. No. 15/423,859, dated Jul. 23, 2018, pp. 1-15, Published: US.

U.S. Patent and Trademark Office, "Restriction Requirement", U.S. Appl. No. 15/423,859, dated Apr. 5, 2018, pp. 1-6, Published: US.

U.S. Patent and Trademark Office, "Notice of Allowance", U.S. Appl. No. 15/423,859, dated Mar. 12, 2019, pp. 1-6, Published: US.

European Patent Office, "Extended European Search Report from EP Application No. 17748220.5 dated Jul. 26, 2019", from Foreign Counterpart to U.S. Appl. No. 15/423,859, pp. 1-10, Published: EP.

European Patent Office, "Communication pursuant to Article 94(3) EPC from EP Application No. 17748220.5", from Foreign Counterpart to U.S. Appl. No. 15/423,859, dated Jun. 9, 2020, pp. 1 through 5, Published: EP.

* cited by examiner

PRIORITY BASED RECONFIGURATION SCHEME FOR REMOTE UNITS

CROSS-REFERENCE TO RELATED APPLICATIONS

This application is a continuation of U.S. application Ser. No. 15/423,859, filed on Feb. 3, 2017, which claims the benefit of U.S. Provisional Patent Application Ser. No. 62/290,715 filed on Feb. 3, 2016, all of which are hereby incorporated herein by reference in their entirety.

BACKGROUND

One way that a wireless cellular service provider can improve the coverage provided by a base station or group of base stations is by using a distributed antenna system (DAS). A DAS typically comprises one or more master units and one or more remote units that are communicatively coupled to the master units. One type of DAS is an analog DAS, in which DAS traffic is distributed between the master units and the remote units in analog form. Another type of DAS is a digital DAS, in which DAS traffic is distributed between the master units and the remote units in digital form.

Remote units in a DAS are communicatively coupled to a master unit via a communication link. Some of the devices in the remote units are reconfigurable and require upgrades to firmware from time to time. The upgrades affect how the remote unit can meet requirements such as bug fixing, feature addition, feature enhancement, mode switching (for example, low power mode), etc. One such device is the physical layer (PHY) device in a remote unit that includes firmware that implements the protocol or algorithm for the PHY device to establish and maintain the communication link between the remote unit and the master unit. Typically, the firmware for the PHY device in a remote unit is upgraded by a technician physically proximate the remote unit via a management port. The technician establishes a direct link via the management port to upgrade the firmware and the communication link is disabled during the upgrade process. The direct communication link via the management port is distinct from the communication link between the remote unit and the master unit.

It is common for the remote units of a DAS to be positioned in locations that are inconvenient for physical access. For example, a remote unit may be positioned in the rafters of a professional sports stadium. Such locations require special equipment to physically access the remote unit and increase the time and cost of maintenance of the remote units. If numerous upgrades are required for the PHY device or other reconfigurable devices that must retain compatibility with the PHY device, it becomes impractical to perform the upgrades locally with a technician.

SUMMARY

One embodiment is directed to a system comprising a first unit communicatively coupled to a second unit via a communication link. The second unit comprises a reconfigurable circuit, wherein first and second circuit configuration images are stored in the second unit, the reconfigurable circuit configured with the first or second circuit configuration image. The second unit further comprises an interface device configured to communicatively couple the second unit to the communication link, wherein first and second interface configuration images are stored in the second unit, the interface device configured with the first or second interface configuration image based on the reconfigurable circuit configuration. The second unit configured so the interface device is configured with the first interface configuration image or the second interface configuration image when the reconfigurable circuit is configured with the first circuit configuration image or the second circuit configuration image respectively.

DRAWINGS

DETAILED DESCRIPTION

Figure 1:
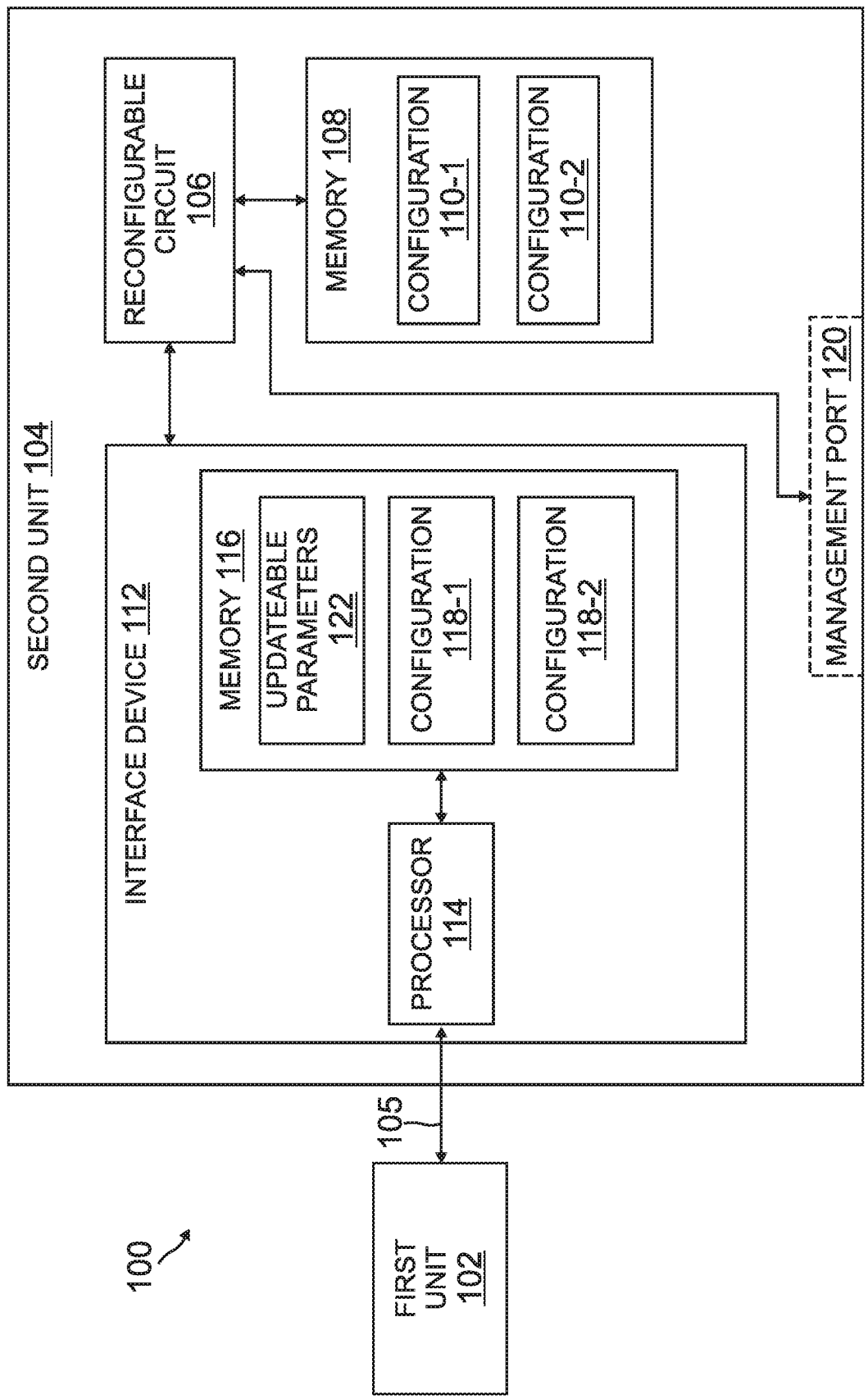
FIG. 1 is block diagram of one exemplary embodiment of a system that uses a priority-based reconfiguration scheme.

FIG. 1 is block diagram of one exemplary embodiment of a system 100 that uses a priority-based reconfiguration scheme. System 100 includes a first unit 102 and a second unit 104 located remotely from the first unit 102. The first unit 102 is communicatively coupled to the second unit 104 via a communication link 105. The communication link 105 may be a wired or wireless communication link. The second unit 104 includes a reconfigurable circuit 106 and an interface device 112.

In the exemplary embodiment of FIG. 1, the first unit 102 is configured to communicate upstream and downstream signals with the second unit 104 via the communication link 105. The first unit 102 may provide update information to the second unit 104 over the communication link 105. Update information may include, for example, a complete update image, an update patch, or the like. The first unit 102 may be the source of the update information or may act as a relay between a management entity (not shown) and the second unit 104. In some implementations, the second unit 104 modifies, replaces, or updates at least one configuration image for either the reconfigurable circuit 106 or the interface device 112 using update information received from the first unit 102 via the communication link 105. In some implementations, the communication link 105 includes a management channel for communicating reconfiguration information and management data and a separate service channel for communicating other types of data (for example, the application-specific data that the units 102 and 104 were designed to communicate between each other).

In the exemplary embodiment shown in FIG. 1, the reconfigurable circuit 106 of the second unit 104 is coupled to at least one first memory device 108 in which a first circuit configuration image 110-1 and a second circuit configuration image 110-2 can be stored. In some implementations, the at least one first memory device 108 only stores the first circuit configuration image 110-1 and the second circuit configuration image 110-2 is transferred to the second unit 104 via the communication link 105. The second unit 104 is configured or protected so that the first circuit configuration image 110-1 cannot be modified, updated, or replaced remotely via the communication link 105. This configuration or protection could be implemented at multiple levels of the system 100. In some implementations, the protection is implemented at an application level by, for example, configuring the software/firmware of the first unit 102 or second unit 104 to not update the first circuit configuration image 110-1. In some implementations, the protection is implemented at an operating system/monitor (OS/M) level by, for example, configuring the first circuit configuration image 110-1 to be protected or read-only. In some implementations, the protection is implemented at a hardware level by, for example, storing the first circuit configuration image 110-1 in read-only memory. The second unit 104 is configured so that the second circuit configuration image 110-2 can be modified, replaced, or updated remotely via the communication link 105. The second circuit configuration image 110-2 can be modified, replaced, or updated remotely via the communication link 105, for example, by modifying a portion of the second circuit configuration image 110-2 or by completely replacing the second circuit configuration image 110-2.

The second unit 104 includes a mechanism to automatically revert back to the first circuit configuration image 110-1 if the reconfigurable circuit 106 is not able to successfully load or otherwise be successfully configured by the updated second circuit configuration image 110-2. That is, in such a situation, the first circuit configuration image 110-1 is automatically loaded or otherwise used to configure the reconfigurable circuit 106. Because the second unit 104 is configured so that the first circuit configuration image 110-1 is not able to be modified, replaced, or updated remotely via the communication link 105, the first circuit configuration image 110-1 should always remain in a usable state that is able to be successfully loaded or otherwise used to configure the reconfigurable circuit 106. In this way, the system 100 ensures that the reconfigurable circuit 106 can successfully load or otherwise be configured by either the first circuit configuration image 110-1 or the second circuit configuration image 110-2.

It should be understood that the particular example of reconfigurable circuit 106 shown in FIG. 1 is merely one implementation of the reconfigurable circuit 106. The reconfigurable circuit 106 can be implemented in other ways. For example, in some implementations, the memory device 108 can be included within the reconfigurable circuit 106 itself.

In the exemplary embodiment shown in FIG. 1, the interface device 112 includes at least one processor 114 coupled to at least one second memory device 116 in which a first interface configuration image 118-1 and a second interface configuration image 118-2 for the interface device 112 can be stored. The at least one processor 114 is configured to load (or otherwise use or be configured by) one of the first interface configuration image 118-1 and the second interface configuration image 118-2 based on the configuration of the reconfigurable circuit 106, which will be discussed in greater detail herein. In some embodiments, the reconfigurable circuit 106 controls which interface configuration image 118 is loaded by the at least one processor 114. The second unit 104 is configured so that the first interface configuration image 118-1 cannot be modified, replaced, or updated remotely via the communication link 105. The memory device 116 further includes an updateable parameters sector 122 that can be used to store user-modifiable values and can be modified, replaced, or updated by the reconfigurable circuit 106.

In some embodiments, the second interface configuration image 118-2 is at least partially modifiable under certain conditions and the second interface configuration image 118-2 may include the updateable parameters 122. The portion of the second interface configuration image 118-2 other than the updateable parameters 122 can be configured or protected from modification in a manner similar to the first circuit configuration image 110-1. In one implementation, the updateable parameters 122 may comprise a first page of the second interface configuration image 118-2 that does not affect whether the second interface configuration image 118-2 can be used to configure the interface device 112.

The second unit 104 is configured so that the second interface configuration image 118-2 can be modified, replaced, or updated remotely via the communication link 105. For example, the second unit 104 can be configured so that the second interface configuration image 118-2 can be modified, replaced or updated remotely via the communication link 105 by modifying a portion of the second interface configuration image 118-2 or by completely replacing the second interface configuration image 118-2. The second unit 104 includes a mechanism to automatically revert back to the first interface configuration image 118-1 if the interface device 112 is not able to successfully load or otherwise successfully use or be configured by the second interface configuration image 118-2. That is, in such a situation, the first interface configuration image 118-1 is automatically loaded or otherwise used to configure the interface device 112. Because the second unit 104 is configured so that the first interface configuration image 118-1 is not able to be modified, replaced, or updated remotely via the communication link 105, the first interface configuration image 118-1 should always remain in a usable state that is able to be successfully loaded or otherwise used to configure the interface device 112. In this way, the system 100 ensures that the interface device 112 can successfully load or otherwise use or be configured by either the first interface configuration image 118-1 or the second interface configuration image 118-2.

The second unit 104 operates with a priority-based reconfiguration scheme to manage the configurations of the reconfigurable circuit 106 and the interface device 112. The priority-based reconfiguration scheme has two tiers. The first tier involves the configuration of the reconfigurable circuit 106 and the second tier involves the configuration of the interface device 112. The second unit 104 is a series system in that both the first and second tiers must work properly for the second unit 104 to operate. In the exemplary embodiment of FIG. 1, the second unit 104 includes parallel modules for each tier (for example, multiple configuration images) to increase the reliability of the system 100. Generally, the status of the first tier (that is, which configuration image 110 is used to configure the reconfigurable circuit 106) will determine which image is loaded in the second tier (that is, which configuration image 118 is used to configure the interface device 112). When the reconfigurable circuit 106 is configured by the first circuit configuration image 110-1 in the first tier, then the interface device 112 is configured with the first interface configuration image 118-1. When the reconfigurable circuit 106 is configured by the second circuit configuration image 110-2 in the first tier, then the interface device 112 is configured with the second interface configuration image 118-2. In one implementation, the first interface configuration image 118-1 is loaded by the at least one processor 114.

If the configuration of the interface device 112 with the second interface configuration image 118-2 is unsuccessful, then the second unit 104 reverts to the first interface configuration image 118-1 to maintain communication between the first unit 102 and the second unit 104. In one implementation, the at least one processor 114 is configured to revert to the first interface configuration image 118-1 if the second interface configuration image 118-2 fails to load.

In the exemplary embodiment shown in FIG. 1, the second unit 104 optionally includes a management port 120 to enable a technician physically proximate the second unit 104 to update at least one of the second circuit configuration image 110-2 or the second interface configuration image 118-2. The technician establishes a direct link via the management port 120 to perform the update and the communication link 105 is disabled during the process. The direct communication link via the management port 120 is distinct from the communication link 105 between the second unit 104 and the first unit 102.

Figure 2:
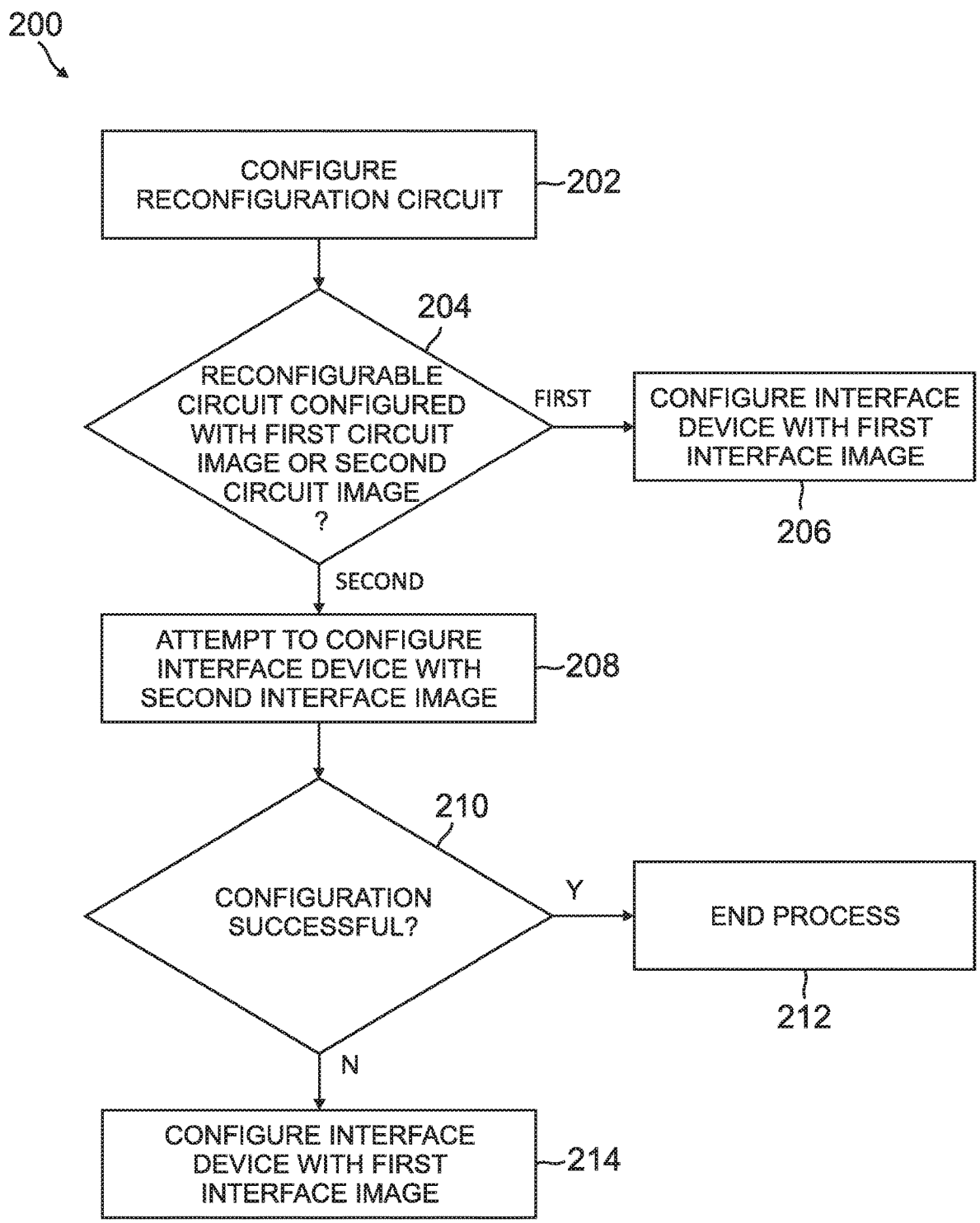
FIG. 2 is a flow diagram of an example method of priority-based remote reconfiguration.

FIG. 2 is a flow diagram of one exemplary embodiment of a method 200 of priority-based reconfiguration for a system that includes a first unit and a second unit. The functions, structures, and other description of elements for such embodiments described herein may apply to like named elements of method 200 and vice versa. The exemplary embodiment shown in FIG. 2 is described herein as being implemented in the system 100 shown in FIG. 1, though it is to be understood that other embodiments of method 200 can be implemented in other ways.

Method 200 comprises configuring a reconfigurable circuit (block 202). In this exemplary embodiment, the reconfigurable circuit is configured with one of a first circuit configuration image and a second circuit configuration image. In some implementations, the first circuit configuration image and the second circuit configuration image are loaded from a memory device external to the reconfigurable circuit. In other implementations, the first circuit configuration image and the second circuit configuration image are loaded from a memory device within the reconfigurable circuit.

Method 200 further comprises determining whether the reconfigurable circuit is configured with the first circuit configuration image or the second circuit configuration image (block 204). In some implementations, the determination is made using a control bit indicating which image was used for the configuration of the reconfigurable circuit.

When the reconfigurable circuit is configured with the first circuit configuration image, then the interface device is configured with the first interface configuration image (block 206). In this exemplary embodiment, the interface device includes at least one processor coupled to a memory device and the reconfigurable circuit loads the first interface configuration image from the memory device to a random-access memory (RAM) of the at least one processor. In exemplary embodiments, the memory device can be the same as the memory device that stores the circuit configuration images.

When the reconfigurable circuit is configured with the second circuit configuration image, then the second unit attempts to configure the interface device with the second interface configuration image (block 208). In this exemplary embodiment, the reconfigurable interface attempts to load the second interface configuration image from the memory device to the RAM of the at least one processor. When the attempted configuration of the reconfigurable circuit with the second interface configuration image is successful, then the process ends (block 212).

In some embodiments, the attempted configuration of the interface device with the second interface configuration image may be unsuccessful. For example, the second interface configuration image may be corrupted or incompatible with the second circuit configuration image due to a bug. When the attempted configuration of the interface device with the second interface configuration image is not successful, then the second unit configures the interface device with the first interface configuration image (214). In exemplary embodiments, the reconfigurable circuit automatically loads the first interface configuration image into a RAM of the at least one processor of the interface device.

The priority-based reconfiguration scheme described above can be used in a variety of applications. One example application where the priority-based reconfiguration scheme described can be used is described below in connection with FIGS. 3A-3B.

Figure 3A:
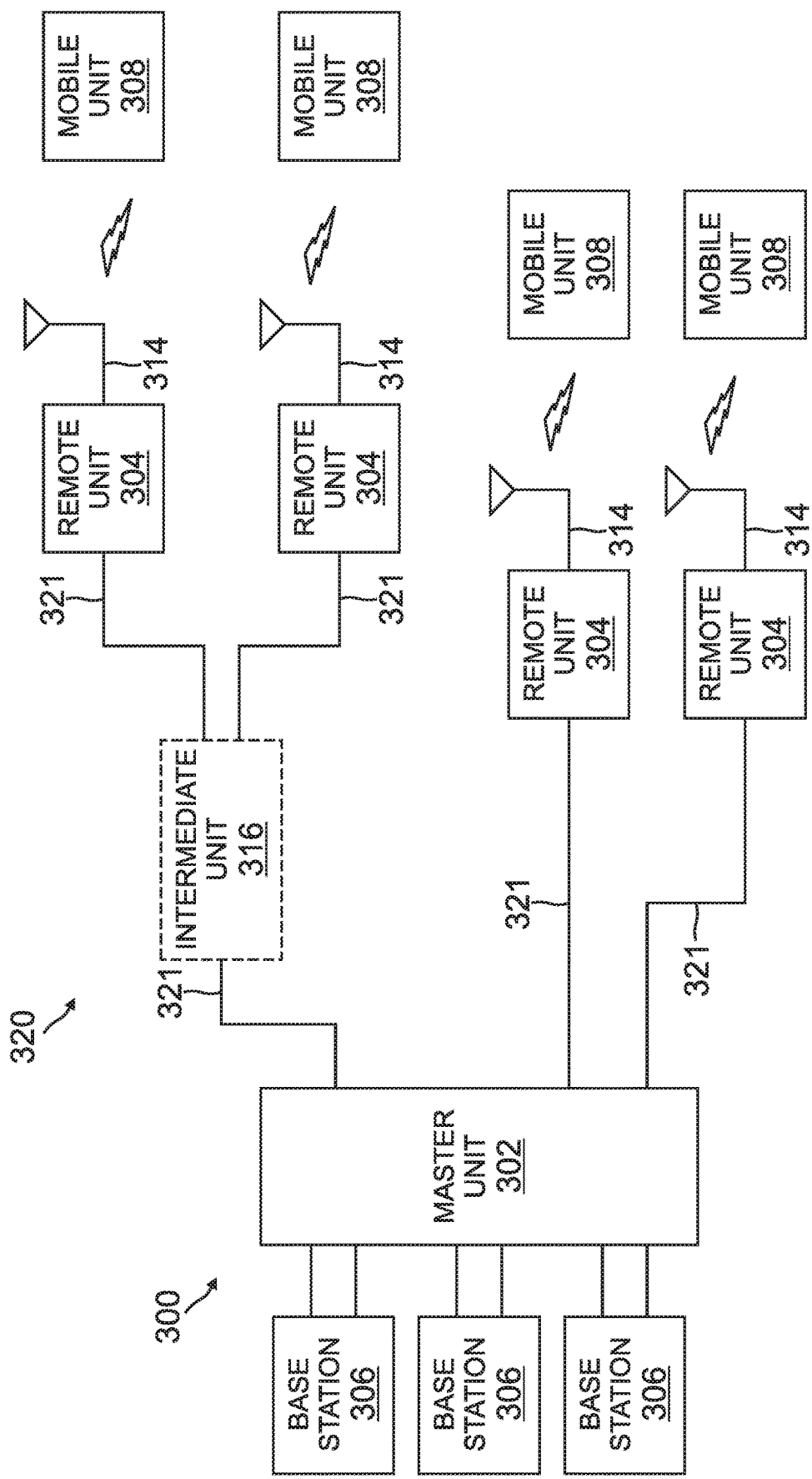
FIGS. 3A-3B are block diagrams of an example distributed antenna system (DAS) used to implement a priority-based reconfiguration scheme.
Figure 3B:
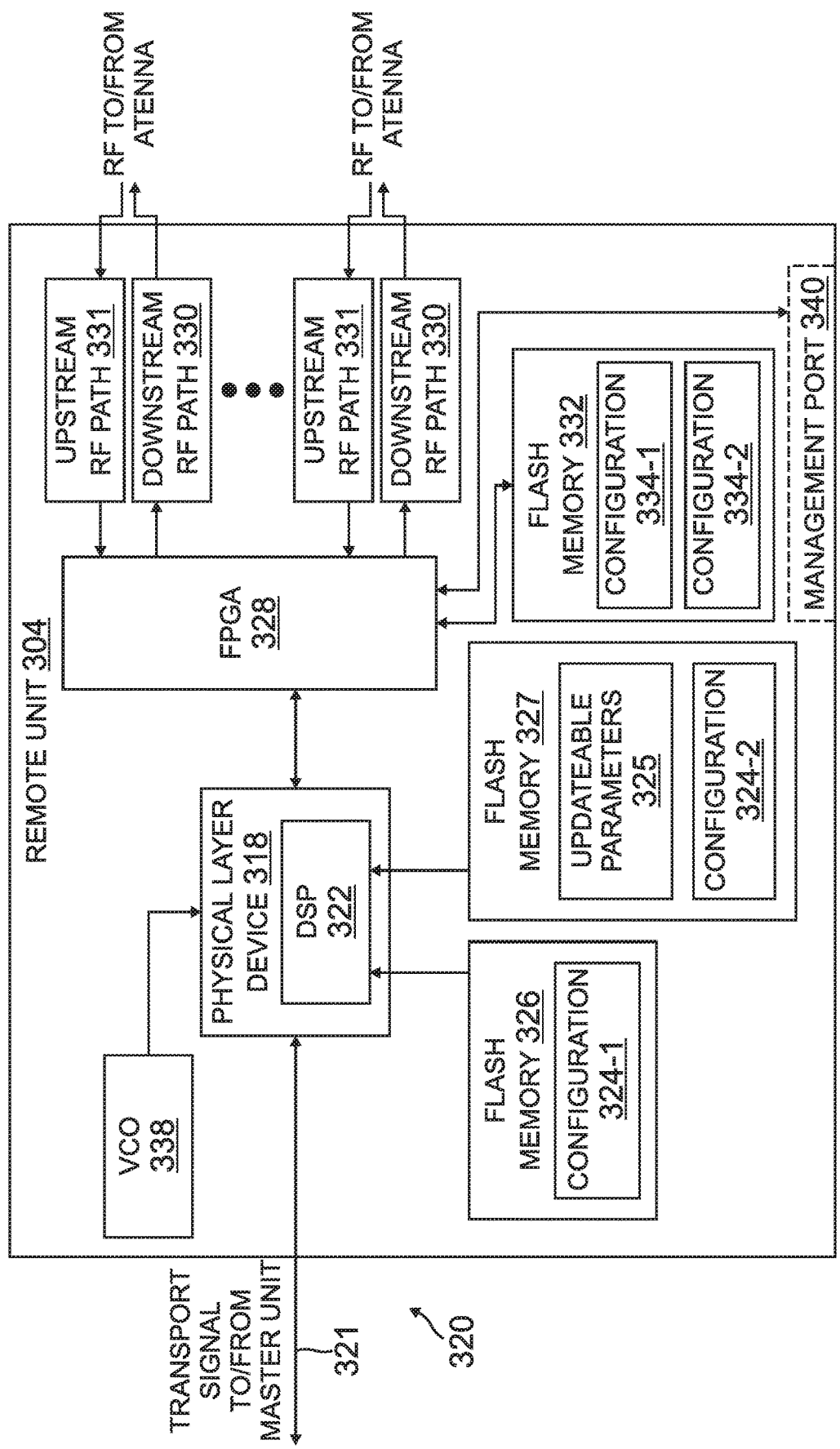

FIGS. 3A-3B are block diagrams of one exemplary embodiment of a distributed antenna system (DAS) 300 in which the priority-based reconfiguration scheme described herein can be implemented. In exemplary embodiments, DAS 300 is a specific implementation of the system 100 described above with respect to FIG. 1.

DAS 300 comprises one or more master units 302 and one or more remote units 304 that are communicatively coupled to the master units 302. In this exemplary embodiment, the DAS 300 comprises a digital DAS, in which DAS traffic is distributed between the master units 302 and the remote units 304 in digital form. In other embodiments, the DAS 300 is implemented, at least in part, as an analog DAS, in which DAS traffic is distributed at least part of the way between the master units 302 and the remote units 304 in analog form.

Each master unit 302 is communicatively coupled to one or more base stations 306. One or more of the base stations 306 can be co-located with the respective master unit 302 to which it is coupled (for example, where the base station 306 is dedicated to providing base station capacity to the DAS 300). Also, one or more of the base stations 306 can be located remotely from the respective master unit 302 to which it is coupled (for example, where the base station 306 is a macro base station providing base station capacity to a macro cell in addition to providing capacity to the DAS 300). In this latter case, a master unit 302 can be coupled to a donor antenna in order to wirelessly communicate with the remotely located base station 306.

The base stations 306 can be implemented as a traditional monolithic base station. Also, the base stations 306 can be implemented using a distributed base station architecture in which a base band unit (BBU) is coupled to one or more remote radio heads (RRHs), where the front haul between the BBU and the RRH uses streams of digital IQ samples. Examples of such an approach are described in the Common Public Radio Interface (CPRI) and Open Base Station Architecture Initiative (OBSAI) families of specifications.

The master units 302 can be configured to use wideband interfaces or narrowband interfaces to the base stations 306. Also, the master units 302 can be configured to interface with the base stations 306 using analog radio frequency (RF) interfaces or digital interfaces (for example, using a CPRI or OBSAI digital IQ interface).

Traditionally, each master unit 302 interfaces with each base station 306 using the analog radio frequency signals that each base station 306 communicates to and from mobile units 308 using a suitable air interface standard. The DAS 300 operates as a distributed repeater for such radio frequency signals. RF signals transmitted from each base station 306 (also referred to herein as "downlink RF signals") are received at one or more master units 302. Each master unit 302 uses the downlink RF signals to generate a downlink transport signal that is distributed to one or more of the remote units 304. Each such remote unit 304 receives the downlink transport signal and reconstructs a version of the downlink RF signals based on the downlink transport signal and causes the reconstructed downlink RF signals to be radiated from at least one antenna 314 coupled to or included in that remote unit 304.

A similar process is performed in the uplink direction. RF signals transmitted from mobile units 308 (also referred to herein as "uplink RF signals") are received at one or more remote units 304. Each remote unit 304 uses the uplink RF signals to generate an uplink transport signal that is transmitted from the remote unit 304 to a master unit 302. Each master unit 302 receives uplink transport signals transmitted from one or more remote units 304 coupled to it. The master unit 302 combines data or signals communicated via the uplink transport signals received at the master unit 302 and reconstructs a version of the uplink RF signals received at the remote units 304. The master unit 302 communicates the reconstructed uplink RF signals to one or more base stations 306. In this way, the coverage of the base stations 306 can be expanded using the DAS 300.

One or more intermediate units 316 (some of which are also referred to here as "expansion units" 316) can be placed between the master units 302 and one or more of the remote units 304. This can be done, for example, in order to increase the number of remote units 304 that a single master unit 302 can feed, to increase the master-unit-to-remote-unit distance, and/or to reduce the amount of cabling needed to couple a master unit 302 to its associated remote units 304.

As noted above, in the exemplary embodiment shown in FIGS. 3A-3B, the DAS 300 is implemented as a digital DAS. In a "digital" DAS, signals received from and provided to the base stations 306 and mobile units 308 are used to produce digital in-phase (I) and quadrature (Q) samples, which are communicated between the master units 302 and remote units 304. It is important to note that this digital IQ representation of the original signals received from the base stations 306 and from the mobile units 308 still maintains the original modulation (that is, the change in the amplitude, phase, or frequency of a carrier) used to convey telephony or data information pursuant to the cellular air interface protocol used for wirelessly communicating between the base stations 306 and the mobile units 308. Examples of such cellular air interface protocols include, for example, the Global System for Mobile Communication (GSM), Universal Mobile Telecommunications System (UMTS), High-Speed Downlink Packet Access (HSDPA), and Long-Term Evolution (LTE) air interface protocols. Also, each stream of digital IQ samples represents or includes a portion of wireless spectrum. For example, the digital IQ samples can represent a single radio access network carrier (for example, a UMTS or LTE carrier of 5 MHz) onto which voice or data information has been modulated using a UMTS or LTE air interface. However, it is to be understood that each such stream can also represent multiple carriers (for example, in a band of frequency spectrum or a sub-band of a given band of frequency spectrum).

In the exemplary embodiment shown in FIGS. 3A-3B, one or more of the master units 302 are configured to interface with one or more base stations 306 using an analog RF interface (for example, either a traditional monolithic base station 306 or via the analog RF interface of an RRH). The base stations 306 can be coupled to the master units 302 using a network of attenuators, combiners, splitters, amplifiers, filters, cross-connects, etc., (sometimes referred to collectively as a "point-of-interface" or "POI"). This is done so that, in the downstream, the desired set of RF carriers output by the base stations 306 can be extracted, combined, and routed to the appropriate master unit 302, and so that, in the upstream, the desired set of carriers output by the master unit 302 can be extracted, combined, and routed to the appropriate interface of each base station 306.

In the exemplary embodiment shown in FIGS. 3A-3B, in the downstream, each master unit 302 can produce digital IQ samples from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by one or more base stations 306. Each portion of wireless radio frequency spectrum can include, for example, a band of wireless spectrum, a sub-band of a given band of wireless spectrum, or an individual wireless carrier.

Likewise, in the upstream, each master unit 302 can produce an upstream analog wireless signal from one or more streams of digital IQ samples received from one or more remote units 304 by digitally combining streams of digital IQ samples that represent the same carriers or frequency bands or sub-bands (for example, by digitally summing such digital IQ samples), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

In the exemplary embodiment shown in FIGS. 3A-3B, one or more of the master units 302 can be configured to interface with one or more base stations 306 using a digital interface (in addition to, or instead of) interfacing with one or more base stations 306 via an analog RF interface. For example, the master unit 302 can be configured to interact directly with one or more BBUs using the digital IQ interface that is used for communicating between the BBUs and an RRHs (for example, using the CPRI serial digital IQ interface).

In the downstream, each master unit 302 terminates one or more downstream streams of digital IQ samples provided to it from one or more BBUs and, if necessary, converts (by re-sampling, synchronizing, combining, separating, gain adjusting, etc.) them into downstream streams of digital IQ samples compatible with the remote units 304 used in the DAS 300. In the upstream, each master unit 302 receives upstream streams of digital IQ samples from one or more remote units 304, digitally combining streams of digital IQ samples that represent the same carriers or frequency bands or sub-bands (for example, by digitally summing such digital IQ samples), and, if necessary, converts (by re-sampling, synchronizing, combining, separating, gain adjusting, etc.) them into upstream streams of digital IQ samples compatible with the one or more BBUs that are coupled to that master unit 302.

Each master unit 302 can be implemented in other ways.

In the downstream, each remote unit 304 receives streams of digital IQ samples from one or more master units 302, where each stream of digital IQ samples represents a portion of wireless radio frequency spectrum output by one or more base stations 306.

As shown in FIG. 3B, each remote unit 304 includes an interface device 318 that is configured to communicatively couple the remote unit 304 to the transport communication link 320 via which the remote unit 304 is communicatively coupled to one or more master units 302. In the exemplary embodiment shown in FIG. 3A, each remote unit 304 is communicatively coupled to one or more master units 302 using one or more ETHERNET-compatible cables 321 (for example, one or more CAT-6A cables). In this embodiment, each remote unit 304 can be directly connected to a master unit 302 via a single ETHERNET cable 321 or indirectly via multiple ETHERNET-compatible cables 321 such as where a first ETHERNET cable 321 connects the remote unit 304 to a patch panel or expansion unit 316 and a second optical fiber cable 321 connects the patch panel or expansion unit 316 to the master unit 302. Each remote unit 304 can be coupled to one or more master units 302 in other ways.

In the exemplary embodiment shown in FIG. 3B, the interface device 318 comprises a reconfigurable ETHERNET physical layer (PHY) device 318. In this embodiment, the ETHERNET PHY device 318 comprises at least one digital signal processor (DSP) 322 that executes firmware 324 in order to implement at least some of the ETHERNET protocol supported by the ETHERNET PHY device 318. In this exemplary embodiment, the ETHERNET PHY device 318 is communicatively coupled to flash memory 326, 327 in which two instances of firmware 324 can be stored for execution by the DSP 322. The first firmware 324-1 is a firmware file programmed into the flash memory 326 by the chip vendor prior to distribution. The first firmware 324-1 is also referred to herein as the factory PHY image 324-1. The remote unit 304 is configured so that the factory PHY image 324-1 cannot be modified, replaced, or updated remotely via the communication link 320. The second firmware 324-2 is a firmware file programmed into the flash memory 327 by the chip vendor after distribution or when the ETHERNET PHY device 318 has been deployed in the field. The second firmware 324-2 is also referred to herein as the field PHY image 324-2. The flash memory 327 may also contain an updateable parameters sector 325, similar to the updateable parameters discussed above with respect to FIG. 1. In exemplary embodiments, a portion of the field PHY image 324-2 is modifiable and may contain the updateable parameters sector 325. In particular, the field PHY image 324-2 may include a first page of the field PHY image 324-2 that is designated as being user-modifiable. In such an embodiment, the remaining portion of the field PHY image 324-2 contains the vendor image. In exemplary embodiments, the flash memories 326, 327 may comprise a single memory device that stores the factory PHY image 324-1 and the field PHY image 324-2 and includes the updateable parameters sector 325.

In the exemplary embodiment shown in FIG. 3B, each remote unit 304 also includes at least one reconfigurable circuit 328. In this exemplary embodiment, the reconfigurable circuit 328 is configured to deframe and frame data communicated over the transport communication link 320 by extracting each stream of digital IQ samples from downstream frames received from the transport communication link 320 at the remote unit 304 and by inserting digital IQ samples for each stream into upstream frames sent on the transport communication link 320 from the remote unit 304. Also, in this exemplary embodiment, the reconfigurable circuit 328 is configured to perform digital signal processing for each stream of digital IQ samples. In the downstream, the reconfigurable circuit 328 is configured to digitally filter, amplify, attenuate, and/or re-sample or interpolate to a higher sample rate the digital IQ samples for each stream and digitally up-convert the resulting digital IQ samples to produce real digital samples, which are output from the reconfigurable circuit 328. In the exemplary embodiment shown in FIG. 3B, the real digital samples for each stream are output to a respective downstream RF signal path 330 that is configured to perform a digital-to-analog process on the real samples in order to produce an IF or baseband analog signal, up-convert the IF or baseband analog signal to the desired RF frequency, and filter and power amplify the resulting downstream frequency signal for radiation from an antenna 314 associated with the remote unit 304.

In the exemplary embodiment shown in FIG. 3B, the remote unit 304 includes a respective upstream RF signal path 331 for each upstream stream of digital IQ samples handled by the remote unit 304. Each upstream RF signal path 331 receives analog RF signal from an antenna 314 associated with the remote unit 304, low noise amplifies the received signal, down-converts the amplified signal to an intermediate frequency (IF) or to baseband, and digitizes the down-converted signal to produce real digital samples, which are input to the reconfigurable circuit 328 for processing thereby.

For each upstream stream handled by the remote unit 304, the reconfigurable circuit 328 digitally down-converts the respective real digital samples to produce digital in-phase (I) and quadrature (Q) samples and filters, amplifies, attenuates, and/or re-samples or decimates to a lower sample rate the digital IQ samples. The reconfigurable circuit 328 frames digital IQ samples into frames (along with control and management data) and outputs the resulting frames to the interface device 318, which transmits the frames on the transport communication link 320 to one or more of the master units 302.

The processing performed by the reconfigurable circuit 328 is reconfigurable. In this exemplary embodiment, the reconfigurable circuit 328 is implemented as a field-programmable gate array (FPGA) 328 that can be reconfigured by loading a different FPGA image. In this exemplary embodiment, the FPGA 328 is coupled to at least one flash memory 332 in which two FPGA images 334 can be stored for reconfiguration of the FPGA 328. In some embodiments, the FPGA images 334 can be stored on separate flash memories. The remote unit 304 is configured so that the first FPGA image 334-1 (also referred to here as the "factory FPGA image" 334-1) cannot be modified, replaced, or updated remotely via the transport communication link 320. The first FPGA image 334-1 is written to the flash memory 332 during production of the remote unit 304 and is typically not updated or reconfigured thereafter. Protection for preventing updating or reconfiguration can be provided in similar ways to those discussed above with respect to the first circuit configuration image 110-1 of FIG. 1. In particular, protections can be implemented at the application level, the OS/M level, and/or the hardware level. The remote unit 304 is configured so that the second FPGA image 334-2 (also referred to here as the "application FPGA image 334-2) can be modified, replaced, or updated remotely via the transport communication link 320. For example, the application FPGA image 334-2 can be updated by remotely modifying a portion of the application FPGA image 334-2 or by completely replacing the application FPGA image 334-2.

The remote unit 304 implements a priority-based reconfiguration scheme similar to that described above with respect to FIG. 1. In the exemplary embodiment of FIGS. 3A-3B, the first tier of the reconfiguration scheme involves the configuration of the FPGA 328 and the second tier involves the configuration of the PHY device 318. The remote unit 304 is a series system in that both the first and second tiers must work properly for the remote unit 304 to operate. In exemplary embodiments, a system boot-loader of the remote unit 304 loads one of the FPGA images from the start address of the flash memory 332 to configure the FPGA 328. If the FPGA 328 is configured by the factory FPGA image 334-1 in the first tier, then the PHY device 318 is configured with the factory PHY image 324-1. In one embodiment, the factory PHY image 324-1 is loaded from the flash memory 326 by the FPGA 328 to the random access memory (RAM) of the DSP 322. When the FPGA 328 is configured by the application FPGA image 334-2 in the first tier, then the PHY device 318 is configured with the field PHY image 324-2. In one embodiment, the field PHY image 324-2 is loaded from the flash memory 327 by the FPGA 328 to the RAM of the DSP 322. If the field PHY image 324-2 fails to load, then the FPGA 328 reverts to or automatically loads the factory PHY image 324-1 to the RAM of the DSP 322 in order to maintain communication between the master unit 302 and the host unit 304.

In some embodiments, another component of the remote unit 304 may affect performance of the remote unit 304 even if the configuration of the FPGA 328 and the PHY device 318 is successful. For example, in the exemplary embodiment shown in FIG. 3B, the remote unit 304 may include a voltage controlled oscillator (VCO) 338 of a phase-locked loop (PLL) based frequency synthesizer to generate a stable reference oscillator frequency for the PHY device 318. After a long time deployment of the remote unit 304, the VCO 338 drifts from the ideal frequency due to an aging problem of the VCO 338. If the output frequency of the VCO 338 drifts from the ideal frequency, the communication link 320 between the master unit 302 and the remote unit 304 will not be operational and an error signal is produced. In exemplary embodiments, the remote unit 304 automatically configures the FPGA 328 with the factory FPGA image 334-1, which includes an algorithm to scan a range of values for the VCO 338 frequency to find a good frequency value. In some embodiments, the algorithm writes the good VCO frequency value to the updateable parameters sector 325 of the flash memory 327. Upon writing the good VCO frequency value to the updateable parameters sector 325 of the flash memory 327, the remote unit 304 will power cycle. In other embodiments, the algorithm writes the good VCO frequency value to the first page of the field PHY image 324-2 that is designated as user-modifiable. Ideally, the FPGA 328 will then be configured by the application FPGA image 334-2 and the good VCO frequency value is used to establish the communication link 320 between the master unit 302 and the remote unit 304.

In exemplary embodiments, the remote unit 304 optionally includes a management port 340 to enable a technician physically proximate the remote unit 304 to update at least one of the application FPGA image 334-2 or the field PHY image 324-2. The technician establishes a direct link via the management port 340 to perform the update and the communication link 320 is disabled during the process. The direct communication link via the management port 340 is distinct from the communication link 320 between the remote unit 304 and the master unit 302.

The methods and techniques described herein may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a system comprising: a first unit; a second unit located remotely from the first unit, wherein the second unit is communicatively coupled to the first unit via a communication link, wherein the second unit comprises: a reconfigurable circuit, wherein a first circuit configuration image and a second circuit configuration image are stored in the second unit, wherein the reconfigurable circuit is configured with one of the first circuit configuration image and the second circuit configuration image; and an interface device configured to communicatively couple the second unit to the communication link, wherein a first interface configuration image and a second interface configuration image are stored in the second unit, wherein the interface device is configured with one of the first interface configuration image and the second interface configuration image based on the configuration of the reconfigurable circuit; wherein the second unit is configured so that the interface device is configured with the first interface configuration image when the reconfigurable circuit is configured with the first circuit configuration image; wherein the second unit is configured so that the interface device is configured with the second interface configuration image when reconfigurable circuit is configured with the second circuit configuration image.

Example 2 includes the system of Example 1, wherein the communication link includes at least two channels.

Example 3 includes the system of any of Examples 1-2, wherein the first circuit configuration image and the second circuit configuration image are stored in at least one memory device.

Example 4 includes the system of any of Examples 1-3, wherein the first interface configuration image and the second interface configuration image are stored in at least one memory device.

Example 5 includes the system of any of Examples 1-4, wherein the interface device comprises at least one processor configured to load one of the first interface configuration image and the second interface configuration image based on the configuration of the reconfigurable circuit.

Example 6 includes the system of Example 5, wherein the at least one processor is further configured to load the first interface configuration image if the interface device is not successfully configured by the second interface configuration image.

Example 7 includes the system of any of Examples 1-6, wherein the second unit further comprises a management port, wherein the management port enables a technician to locally reconfigure at least one of the second circuit configuration image and the second interface configuration image, wherein the management port is distinct from the communication link.

Example 8 includes a distributed antenna system (DAS) comprising: a master unit; a remote unit located remotely from the master unit, wherein the remote unit is communicatively coupled to the master unit via a communication link, wherein the remote unit comprises: a field-programmable gate array (FPGA), wherein a first FPGA image and a second FPGA image are stored in the remote unit, wherein the FPGA is configured with one of the first FPGA image and the second FPGA image; and a physical layer (PHY) device configured to communicatively couple the remote unit to the communication link, wherein a first PHY image and a second PHY image are stored in the remote unit, wherein the PHY device is configured with one of the first PHY image and the second PHY image based on the configuration of the FPGA; wherein the remote unit is configured so that the PHY device is configured with the first PHY image when the FPGA is configured with the first FPGA image; wherein the remote unit is configured so that the PHY device is configured with the second PHY image when FPGA is configured with the second FPGA image.

Example 9 includes the DAS of Example 8, wherein the PHY device comprises an Ethernet PHY device, and wherein the remote unit further comprises a first flash memory device in which the first PHY image is stored; and a second flash memory device in which the second PHY image is stored.

Example 10 includes the DAS of Example 9, wherein the remote unit further comprises a voltage controlled oscillator (VCO) of a phase-locked loop (PLL) based frequency synthesizer.

Example 11 includes the DAS of Example 10, wherein the FPGA is configured to scan VCO frequencies when it is determined that a frequency of the VCO has drifted, wherein the FPGA writes a VCO frequency value to an updateable parameters sector of the second flash memory device.

Example 12 includes the DAS of any of Examples 10-11, wherein the FPGA writes the VCO frequency value to an updateable parameters portion of the second PHY image, wherein the rest of the second PHY image is read-only.

Example 13 includes the DAS of Example 11, wherein the remote unit is configured to power cycle after the FPGA writes the VCO frequency value to one of the first PHY image or the second PHY image.

Example 14 includes the DAS of any of Examples 8-13, wherein the remote unit is communicatively coupled to the master unit using an expansion unit.

Example 15 includes a method of priority based reconfiguration for a second unit in a system comprising a first unit communicatively coupled to the second unit via a communication link, wherein the second unit is located remotely from the first unit, the method comprising: configuring a reconfigurable circuit of the second unit with one of a first circuit configuration image and a second circuit configuration image; determining whether the reconfigurable circuit is configured with the first circuit configuration image or the second circuit configuration image; configuring an interface device with a first interface configuration image when the reconfigurable circuit is configured with the first circuit configuration image, wherein the interface device is configured to communicatively couple the second unit to the communication link; and attempting to configure the interface device with a second interface configuration image when the reconfigurable circuit is configured with the second circuit configuration image.

Example 16 includes the method of Example 15, further comprising configuring the interface device with the first interface configuration image when the attempted configuration with the second interface configuration image fails.

Example 17 includes a method of priority based reconfiguration for a remote unit in a distributed antenna system (DAS) comprising a master unit communicatively coupled to the remote unit via a communication link, wherein the remote unit is located remotely from the master unit, the method comprising: configuring a field-programmable gate array (FPGA) of the remote unit with one of a first FPGA image and a second FPGA image; determining whether the FPGA is configured with the first FPGA image or the second FPGA image; configuring a physical layer (PHY) device with a first PHY image when the FPGA is configured with the first FPGA image, wherein the PHY device is configured to communicatively couple the remote unit to the communication link; and attempting to configure the PHY device with a second PHY image when the FPGA is configured with the second FPGA image.

Example 18 includes the method of Example 17, further comprising: detecting an error in a frequency value of a voltage-controlled oscillator (VCO) of the remote unit; scanning a range VCO frequencies; identifying a VCO frequency value that eliminates the error; and modifying a first sector of a flash memory device used to store the second PHY image to include the VCO frequency value that eliminates the error.

Example 19 includes a second unit of a system comprising a first unit communicatively coupled to the second unit via a communication link, the second unit comprising: a reconfigurable circuit, wherein a first circuit configuration image and a second circuit configuration image are stored in the second unit, wherein the reconfigurable circuit is configured with one of the first circuit configuration image and the second circuit configuration image; and an interface device configured to communicatively couple the second unit to a communication link with a first unit, wherein a first interface configuration image and a second interface configuration image are stored in the second unit, wherein the interface device is configured with one of the first interface configuration image and the second interface configuration image based on the configuration of the reconfigurable circuit; wherein the second unit is configured so that the interface device is configured with the first interface configuration image when the reconfigurable circuit is configured with the first circuit configuration image; wherein the second unit is configured so that the interface device is configured with the second interface configuration image when the reconfigurable circuit is configured with the second circuit configuration image.

Example 20 includes the second unit of Example 19, wherein the second unit is configured to automatically revert to the first circuit configuration image if the reconfigurable circuit is not able to be successfully configured by the second circuit configuration image.

Example 21 includes a remote unit of a distributed antenna system (DAS) comprising the remote unit communicatively coupled to a master unit via a communication link, the remote unit comprising: a field-programmable gate array (FPGA), wherein a first FPGA image and a second FPGA image are stored in the remote unit, wherein the FPGA is configured with one of the first FPGA image and the second FPGA image; and a physical layer (PHY) device configured to communicatively couple the remote unit to the communication link, wherein a first PHY image and a second PHY image are stored in the second unit, wherein the PHY device is configured with one of the first PHY image or the second PHY image based on the configuration of the FPGA; wherein the remote unit is configured so that the PHY device is configured with the first PHY image when the FPGA is configured with the first FPGA image; wherein the remote unit is configured so that the PHY device is configured with the second PHY image when the FPGA is configured with the second FPGA image.

Example 22 includes the remote unit of Example 21, wherein the FPGA is configured to scan VCO frequencies when it is determined that the VCO frequency has drifted, wherein the FPGA is configured to write a VCO frequency value to an updateable parameters sector of the flash memory device used to store the second PHY image.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system comprising:
a first unit;
a second unit located remotely from the first unit, wherein the second unit is communicatively coupled to the first unit via a communication link, wherein the second unit comprises:
a reconfigurable circuit, wherein the reconfigurable circuit is configured with either a first circuit configuration image or a second circuit configuration image; and
an interface device configured to communicatively couple the second unit to the communication link;
wherein the second unit is configured so that the interface device is configured with either a first interface configuration image or a second interface configuration image based on the configuration of the reconfigurable circuit.

2. The system of claim 1, wherein the communication link includes at least two channels.

3. The system of claim 1, wherein the first circuit configuration image and the second circuit configuration image are stored in at least one memory device of the second unit.

4. The system of claim 1, wherein the first interface configuration image and the second interface configuration image are stored in at least one memory device of the second unit.

5. The system of claim 1, wherein the interface device comprises at least one processor configured to load one of the first interface configuration image and the second interface configuration image based on the configuration of the reconfigurable circuit.

6. The system of claim 5, wherein the at least one processor is further configured to load the first interface configuration image if the interface device is not successfully configured by the second interface configuration image.

7. The system of claim 1, wherein the second unit further comprises a management port, wherein the management port enables a technician to locally reconfigure at least one of the second circuit configuration image and the second interface configuration image, wherein the management port is distinct from the communication link.

8. The system of claim 1, wherein the system comprises a distributed antenna system, wherein the first unit comprises a master unit, wherein the second unit comprises a remote antenna unit, wherein the reconfigurable circuit comprises a field-programmable gate array (FPGA), wherein the first circuit configuration image comprises a first FPGA image, wherein the second circuit configuration image comprises a second FPGA image, wherein the interface device comprises a physical layer (PHY) device, wherein the first interface configuration image comprises a first PHY image, wherein the second interface configuration image comprises a second PHY image.

9. The system of claim 8, wherein the PHY device comprises an Ethernet PHY device, and wherein the remote antenna unit further comprises a first flash memory device in which the first PHY image is stored and a second flash memory device in which the second PHY image is stored.

10. The system of claim 9, wherein the remote antenna unit further comprises a voltage-controlled oscillator (VCO) of a phase-locked loop (PLL) based frequency synthesizer;
wherein the FPGA is configured to scan VCO frequencies when it is determined that a frequency of the VCO has drifted, wherein the FPGA is configured to write a VCO frequency value to an updateable parameters sector of the second flash memory device.

11. The system of claim 10, wherein the FPGA is configured to write the VCO frequency value to an updateable parameters portion of the second PHY image, wherein the rest of the second PHY image is read-only.

12. The system of claim 1, wherein the second unit is configured so that the first circuit configuration image cannot be modified, replaced, or updated remotely via the communication link; and
wherein the second unit is configured so that the second circuit configuration image can be modified, replaced, or updated remotely via the communication link.

13. The system of claim 1, wherein the second unit is configured so that the first interface configuration image cannot be modified, replaced, or updated remotely via the communication link; and
wherein the second unit is configured so that the second interface configuration image can be modified, replaced, or updated remotely via the communication link.

14. The system of claim 8, wherein the remote antenna unit is communicatively coupled to the master unit using an expansion unit.

15. A method of priority-based reconfiguration for a second unit in a system comprising a first unit communicatively coupled to the second unit via a communication link, wherein the second unit is located remotely from the first unit, the method comprising:
configuring a reconfigurable circuit of the second unit with either a first circuit configuration image or a second circuit configuration image;
determining whether the reconfigurable circuit is configured with the first circuit configuration image or the second circuit configuration image;
configuring an interface device of the second unit with either a first interface configuration image or a second interface configuration image based on the configuration of the reconfigurable circuit, wherein the interface device is configured to communicatively couple the second unit to the communication link.

16. The method of claim 15, further comprising configuring the interface device with the first interface configuration image when an attempted configuration with the second interface configuration image fails.

17. The method of claim 15, wherein the system comprises a distributed antenna system, wherein the first unit comprises a master unit, wherein the second unit comprises a remote antenna unit, wherein the reconfigurable circuit comprises a field-programmable gate array (FPGA), wherein the first circuit configuration image comprises a first FPGA image, wherein the second circuit configuration image comprises a second FPGA image, wherein the interface device comprises a physical layer (PHY) device, wherein the first interface configuration image comprises a first PHY image, wherein the second interface configuration image comprises a second PHY image.

18. A second unit of a system comprising a first unit communicatively coupled to the second unit via a communication link, the second unit comprising:

a reconfigurable circuit, wherein a first circuit configuration image and a second circuit configuration image are stored in the second unit, wherein the reconfigurable circuit is configured with either the first circuit configuration image or the second circuit configuration image; and an interface device configured to communicatively couple the second unit to a communication link with the first unit, wherein the second unit is configured so that the interface device is configured with either a first interface configuration image or a second interface configuration image based on the configuration of the reconfigurable circuit.

19. The second unit of claim 18, wherein the second unit is configured to automatically revert to the first circuit configuration image if the reconfigurable circuit is not able to be successfully configured by the second circuit configuration image.

20. The second unit of claim 18, wherein the system comprises a distributed antenna system, wherein the first unit comprises a master unit, wherein the second unit comprises a remote antenna unit, wherein the reconfigurable circuit comprises a field-programmable gate array (FPGA), wherein the first circuit configuration image comprises a first FPGA image, wherein the second circuit configuration image comprises a second FPGA image, wherein the interface device comprises a physical layer (PHY) device, wherein the first interface configuration image comprises a first PHY image, wherein the second interface configuration image comprises a second PHY image.

* * * * *